United States Patent [19]
Tominaga et al.

[11] Patent Number: 4,885,329
[45] Date of Patent: Dec. 5, 1989

[54] POLYIMIDE RESIN COMPOSITIONS

[75] Inventors: Kaoru Tominaga; Kojiro Kan; Toshimasa Takata; Toru Tomoshige, all of Ichihara, Japan

[73] Assignee: Mitsui Petrochemical Industries, Ltd., Tokyo, Japan

[21] Appl. No.: 181,529

[22] Filed: Apr. 14, 1988

[30] Foreign Application Priority Data

Apr. 14, 1987 [JP] Japan ................................. 62-89692
May 29, 1987 [JP] Japan ................................ 62-131398

[51] Int. Cl.$^4$ ............................................. C08K 3/18
[52] U.S. Cl. .................................... 524/430; 524/506; 524/514; 524/588; 524/425; 524/431; 524/451; 524/404; 524/437; 524/401; 524/424; 524/730; 524/731; 525/422; 525/431
[58] Field of Search ................ 525/422, 431; 524/430, 524/506, 514, 588, 425, 431, 451, 437, 404, 401, 424, 730, 731

[56] References Cited

U.S. PATENT DOCUMENTS 3,909,475  9/1975  Schneider ........................... 524/188
4,238,591 12/1980  Cassat et al. ......................... 528/27
4,361,690 11/1982  Locatelli ............................... 528/21

Primary Examiner—Melvyn I. Marquis
Attorney, Agent, or Firm—Sherman and Shalloway

[57] ABSTRACT

A semiconductor encapsulating material is obtained from a polyimide resin composition comprising (A) a polyaminobismaleimide resin, (B) a silicone monomer and/or oligomer having a hydroxyl or alkoxyl group bonded to a silicon atom and mixtures thereof, and (C) an inorganic filler wherein the weight ratio of polyaminobismaleimide resin (A) to silicone component (B) ranges from 99.5/0.5 to 70/30, and the weight ratio of polyaminobismaleimide resin (A) to inorganic filler (C) ranges from 100/50 to 100/1000.

5 Claims, No Drawings

POLYIMIDE RESIN COMPOSITIONS

BACKGROUND OF THE INVENTION

1. Field of the Invention

This invention relates to polyimide resin compositions. More particularly, it relates to polyimide resin compositions useful as semiconductor encapsulating material and also applicable as semiconductor package substrates and hybrid IC substrates.

2. Discussion of Prior Art

At present, IC, LSI and other semiconductor circuits are encapsulated with resinous sealants, typically epoxy resin-silica blends by transfer molding. With a rapidly increasing degree of integration of semiconductor circuit, the conventional epoxy-silica encapsulating compounds turn to be unsatisfactory because they have an increased coefficient of linear thermal expansion and are less heat resistant and less reliable.

There is a need for a resin based encapsulating compound having a higher heat resistance and a lower coefficient of linear expansion. In this respect, polyimide resins are promising resins.

In general, polyimide resins are less resistant to humidity. Polyimide resins are blended with inorganic fillers to form semiconductor encapsulating compounds which often fail to play the requisite role of imparting humidity resistance to semiconductor circuits. The polyimide resins are thus regarded unsuitable as encapsulating compound.

Tailored polyimide resins are known in the art, including reaction products from oligoimides and hydroxylic organic silicon compounds and reaction products from oligoimides, polyamines and hydroxylic organic silicon compounds as disclosed in Japanese Patent Application Kokai No. 54-138100 and 56-11926. Aging resistance is imparted to ordinary polyimide resins while maintaining their heat resistance.

In summary, conventional epoxy resin-silica blends have a high coefficient of linear expansion and are less heat resistant and less reliable, and conventional polyimide resins are less moisture-proof.

SUMMARY OF THE INVENTION

A primary object of the present invention is to provide an improved polyimide resin composition.

Another object of the present invention is to provide an improved polyimide resin composition useful as semiconductor encapsulating material.

According to the present invention, there is provided a polyimide resin composition comprising (A) a polyaminobismaleimide resin, (B) a silicone component selected from the group consisting of silicone monomers having a hydroxyl or alkoxyl group bonded to a silicon atom, silicone oligomers having a hydroxyl or alkoxyl group bonded to a silicon atom, and mixtures of said silicone monomers and oligomers and (C) an inorganic filler, wherein the weight ratio of polyaminobismaleimide resin (A) to silicone component (B) ranges from 99.5/0.5 to 70/30, and the weight ratio of polyaminobismaleimide resin (A) to inorganic filler (C) ranges from 100/50 to 100/1000.

DETAILED DESCRIPTION OF THE INVENTION

We have found that the humidity resistance of a polyimide resin can be drastically improved by blending therein a silicone monomer or oligomer having a hydroxyl or alkoxyl group attached to an Si atom and an inorganic filler. There is obtained a polyimide resin composition which experiences little loss of volume resistance after a pressure cooker test (PCT) while maintaining the high heat resistance and low coefficient of linear thermal expansion inherent to polyimide resin.

Briefly stated, the present invention provides a polyimide resin composition comprising (A) a polyaminobismaleimide resin, (B) a silicone component selected from the group consisting of silicone monomers and oligomers having a hydroxyl or alkoxyl group bonded to a silicon atom and mixtures thereof, and (C) an inorganic filler. The weight ratio (A/B) of polyaminobismaleimide resin to silicone component ranges from about 99.5/0.5 to about 70/30, and the weight ratio (A/C) of polyaminobismaleimide resin to inorganic filler ranges from about 100/50 to about 100/1000.

The polyimide resin composition may be prepared by mixing (A) a polyaminobismaleimide resin, (B) a silicone component selected from the group consisting of silicone monomers and oligomers having a hydroxyl or alkoxyl group bonded to a silicon atom and mixtures thereof, and (C) an inorganic filler while heating at a temperature above the softening point of polyaminobismaleimide resin (A) whereby components (A), (B) and (C) are homogeneously admixed and the silicone component (B) condenses primarily by itself and/or gives rise to coupling reaction with inorganic filler (C). There is obtained a molding resin composition.

The composition is comminuted into particles of a suitable size so that it may be molded by any desired molding methods including transfer molding, injection molding and compression molding. The composition may be applied as semiconductor encapsulating material or as semiconductor boards and post-cured into a product which experiences little loss of volume resistance after a pressure cooker test (PCT) and maintains the high heat resistance and low coefficient of linear thermal expansion characteristic of polyimide resin.

The components of the polyimide resin composition according to the present invention will be described in detail.

(A) Polyaminobismaleimide resin

The polyaminobismaleimide resin used herein is a reaction product obtained by reacting a bismaleimide of general formula (I):

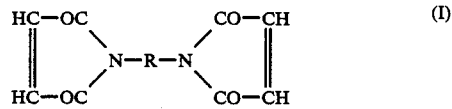

wherein R is a divalent organic radical, preferably an aromatic radical, with an aromatic diamine of general formula (II):

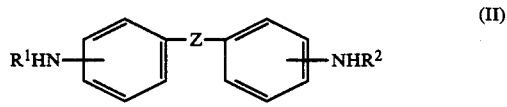

wherein Z is —CH₂—, —O—, —S—, —SO— or —SO₂—, and

R¹ and R² are independently selected from the group consisting of hydrogen, lower alkyl radicals, aryl radicals, cycloalkyl radicals and lower acyl radicals.

Examples of the bismaleimide represented by formula (I) include N,N'-m-phenylenedimaleimide, N,N'-p-phenylene, dimaleimide, N,N'-oxy(di-p-phenylene)dimaleimide, N,N'-methylene(di-p-phenylene)dimaleimide N,N'-ethylene(di-p-phenylene)dimaleimide, N,N'-sulfo(di-p-phenylene)-dimaleimide, N,N'-m-phenylenebis(p-oxyphenylene)-dimaleimide, N,N'-methylene(di-1,4-cyclohexylene)-dimaleimide, N,N'-isopropylidene(di-1,4-cyclohexylene)-dimaleimide, 2,6-xylylenedimaleimide, 2,5-oxadiazolylene-dimaleimide, N,N'-p-phenylene(dimethylene)dimaleimide, N,N'-2-methyl-p-toluylenedimaleimide, N,N'-thio(diphenylene)dicitraconimide, N,N'-methylene(dipphenylene)bis(chloromaleimide), and N,N'-hexamethylenebis(cyanomethylmaleimide).

Examples of the aromatic diamine represented by formula (II) include 4,4'-diaminodiphenylsulfone, 3,3'-diaminodiphenylsulfone, 4,4'-diaminodiphenylmethane, 4,4'-diaminodiphenylether, m-phenylenediamine, p-phenylenediamine, 2,2-bis(4-aminophenyl)propane, benzidine, 4,4'diaminodiphenylsulfone, bis(4-aminophenyl)methylphosphinoxide, bis(4-aminophenyl)-phenylphosphinoxide, bis(4-aminophenyl)methylamine, 1,5-diaminonaphthalene, 1,1-bis(p-aminophenyl)phthalan, 4,4'-diaminobenzophenone, 4,4'-diaminoazobenzene, bis(4-aminophenyl)phenylmethane, 1,1-bis(4-aminophenyl)cyclohexane, 1,1-bis(4-amino-3-methyl-phenyl)cyclohexane, 2,5-bis(m-aminophenyl)-1,3,4-oxadiazole, 2,5-bis(p-aminophenyl)-1,3,4-oxadiazole, 2,5-bis(m-aminophenyl)thiazolo(4,5-d)thiazole, 5,5'-di(m-aminophenyl)-2,2'-bis(1,3,4-oxadiazolyl), 4,4'-bis(p-aminophenyl)-2,2'-dithiazole, m-bis(4-p-aminophenyl)-2thiazolylbenzene, 2,2'-bis(m-aminophenyl)-5,5'-dibenzimidazole, 4,4'-diaminobenzanilide, 4,4'-diaminophenylbenzoate, N,N'-bis(4-aminobenzyl)-p-phenylenediamine, 3,5-bis(m-aminophenyl)-4-phenyl-1,2,4-triazole and salts thereof with inorganic acids.

The polyaminobismaleimide resin used herein may be obtained by reacting a bismaleimide with an aromatic diamine as described above by a well-known method. The reaction product preferably has a molecular weight of about 400 to about 1,500 and may contain a substantial amount of unreacted monomers.

Also contemplated herein are polyaminobismaleimide prepolymer compositions comprising the foregoing polyaminobismaleimide resin and a trifunctional epoxy compound which is obtained by condensation reaction of epichlorohydrin with a phenol derivative of formula (III).

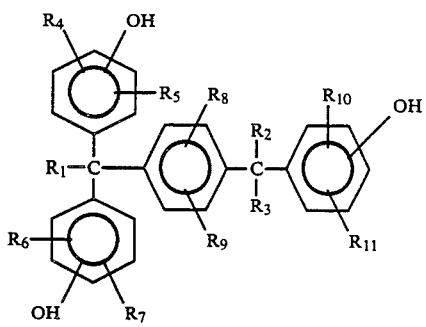

In formula (III), R₁ through R₃ are independently selected from hydrogen and alkyl radicals having up to 6 carbon atoms, and R₄ through R₁₁ are independently selected from hydrogen, alkyl radicals having up to 6 carbon atoms, and halogen atoms. R₁ through R₁₁ may be the same or different.

The trifunctional epoxy compound is characterized by the chemical structure that four benzene rings are connected via one carbon atom in a branched manner as understood from the structure of trisphenol represented by general formula (III). By blending the epoxy compound in the polyaminobismaleimide prepolymer, the adhesion of the prepolymer to glass cloth and metal can be improved without losing the heat resistance of the prepolymer.

Examples of the epoxy compound include
1-[α-methyl-α-(4'-glycidoxyphenyl)ethyl]-4-[α', α'-bis(-4''-glycidoxyphenyl)ethyl]benzene,
1-[α-methyl-α-(2'-methyl-4'-glycidoxy-5'-tert.-butylphenyl)ethyl]-4-[α', α'-bis(2''-methyl-4''-glycidoxy-5''-tert.-butylphenyl) ethyl]benzene,
1-[α-methyl-α-(3',5'-dimethyl-4'-glycidoxyphenyl)ethyl]-4-[α',α'-bis(3'',5''-dimethyl-4''-glycidoxyphenyl)ethyl]benzene,
1-[α-methyl-α-(3'-tert.-butyl-4'-glycidoxyphenyl)-ethyl]-4-[α', α'-bis(3''-tert.-butyl-4''-glycidoxyphenyl) ethyl]benzene,
1-[α-methyl-α-(3'-methyl-4'-glycidoxy-5'-tert.-butylphenyl)ethyl]-4-[α',α'-bis(3''-methyl-4''-glycidoxy-5''-tert.-butylphenyl)ethyl]benzene, and
1-[α-methyl-α-(2',5'-dimethyl-4'-glycidoxyphenyl)ethyl]-4-[α',α'-bis(2'',5''-dimethyl-4''-glycidoxyphenyl)ethyl]benzene.

In the trifunctional epoxy compound mentioned above, the glycidoxy groups, that is, phenolic hydroxyl groups in formula (III) are preferably bonded to the corresponding phenyl groups at their para position. Preferably, R₁ through R₃ each are alkyl radicals having up to 4 carbon atoms, most preferably methyl radicals, and R₄ through R₉ each are hydrogen, methyl or tert.-butyl radicals.

The epoxy compound mentioned above may be prepared by etherifying a trisphenol of formula (III) with epichlorohydrin in the presence of a suitable etherification catalyst, followed by dehydrohalogenation.

(B) Silicone component

The silicone component is selected from the group consisting of silicone monomers having at least one hydroxyl or alkoxyl group bonded to a silicon atom, silicone oligomers having at least one hydroxyl or alkoxyl group bonded to a silicon atom, and mixtures thereof.

Examples of the silicone monomer and oligomer include triphenylsilanol, diphenyldisilane diol, methylphenylsilane diol, diethylsilane diol, dimethoxydiphenylsilane, diethoxydiphenylsilane, phenyltriethoxysilane, diethoxydimethylsilane, triethoxysilane, 1,1-dimethyl-3,3-diphenyldisiloxane-1,3-diol, 1,4-bis(hydroxydimethylsilyl)benzene, and diphenylethoxyvinylsilane. The silicone monomers and oligomers may be used alone or in admixture.

(C) Inorganic filler

The inorganic fillers used herein include fused silica (amorphous), crystalline silica, alumina and a mixture thereof. These fillers may be used as a blend thereof with another filler such as titanium, mica, calcium carbonate, talc, aluminum hydroxide, cordierite, boron nitride, silicon carbide, and glass fibers.

The components (A) and (B) described above preferably are blended such that the weight ratio (A/B) of polyaminobismaleimide resin to silicone component ranges from about 99.5/0.5 to about 70/30, more preferably from 98/2 to 80/20. Within this range (70/30 $\leq$ A/B $\leq$ 99.5/0.5), good humidity resistance, higher heat resistance, and lower coefficient of linear expansion of the resulting composition are realized.

The components (A) and (C) described above preferably are blended such that the weight ratio (A/C) of polyaminobismaleimide resin to inorganic filler ranges from about 100/50 to about 100/1000, more preferably from about 100/100 to about 100/600. Within this range (100/1000 $\leq$ A/C $\leq$ 100/50), good moldability, better humidity resistance, and lower coefficient of linear expansion of the resulting composition are realized.

In addition to the foregoing essential components, the composition of the present invention may further contain any well-known additives, for example, curing accelerators, internal release agents, silane coupling agents, coloring agents, and flame retardants alone or in combination of two or more. These additives may be blended in a commonly used proportion as long as the object of the present invention is not impaired. Examples of the agents for accelerating curing of polyaminobismaleimide are peroxides and imidazoles; the internal release agents include carnauba wax, stearic acid, and montan wax; the silane coupling agents include γ-glycidoxypropyltrimethoxysilane and γ-aminopropyltriethoxysilane; the coloring agents include carbon black; and the flame retardants include bromine compounds and antimony oxide.

The polyimide resin composition of the present invention may be prepared by blending predetermined amounts of polyaminobismaleimide resin (A), monomeric or oligomeric silicone (B), and inorganic filler (C). The blend is placed in a kneader, for example, a twin screw extruder or a two roll mill where it is milled at a temperature above the softening point of the polyaminobismaleimide resin, for example, at a temperature in the range of from about 100° to about 130° C. The blend is cooled to room temperature and comminuted into granules or powder, obtaining a compound for molding.

The compound is ready for molding by any desired molding methods including transfer molding, injection molding, and compression molding. In the case of transfer molding, for example, the resin compound may be molded at a temperature of from about 180° to about 200° C. for a time of from about 5 to about 15 minutes. The molding pressure may vary with the molding technique and temperature, but generally ranges from about 30 to about 100 kg/cm$^2$. In the case of room temperature compression molding or sintering molding, a high pressure of from about 200 kg/cm$^2$ to about several t/cm$^2$ is preferably applied. When the resin compound is used as substrates for example rather than as encapsulating material, a pressure of about 30 kg/cm$^2$ to about 1 t/cm$^2$ is applicable.

The article molded by the afore-mentioned method may be post cured at a temperature as high as about 180° to about 220° C. in an air oven for about 6 to about 24 hours, obtaining a cured article having the desired properties as well as the properties characteristic of polyimide resin.

The article of the resin composition prepared as above is substantially improved in properties as compared with the conventional encapsulating resins. The article experiences little loss of volume resistance after a pressure cooker test and has improved heat resistance and a low coefficient of linear expansion.

Although the resin composition of the present invention is described as primarily used as semiconductor encapsulating material, the composition may also be used as semiconductor substrate material such as semiconductor package boards and hybrid IC boards which require the same properties as the encapsulating material.

EXAMPLE

Examples of the polyimide resin composition are given below by way of illustration and not by way of limitation.

Examples 1–6

A compound for molding was prepared by blending the components shown in Table 1 in the amounts indicated therein, thoroughly milling the blend in a two roll mill, cooling the blend, and comminuting the blend into granules.

This compound was molded by a transfer molding machine under the following conditions into prism and plate shaped test pieces of 12.5 mm × 12.5 mm × 60 mm and 100 mm × 100 mm × 2 mm.

Molding temperature: 180° C.
Molding time: 10 minutes
Molding pressure: 70 kg/cm$^2$ The test pieces were post cured in an air oven at 180° C. for 20 hours before they were measured for physical properties.

Measurement of physical properties was carried out on the test pieces according to the following procedures. The results are shown in Table 1.

(1) Coefficient of linear expansion

A test piece of 12.5 mm × 12.5 mm × 60 mm was used. The coefficient of linear expansion of a test piece was measured according to ASTM D-696.

(2) Glass transition temperature (Tg)

The glass transition temperature is a point of inflection in the temperature-deformation curve obtained from the measurement of coefficient of linear expansion according to ASTM D-696.

(3) Volume resistance

A plate test piece of 100 mm × 100 mm × 2 mm was used. The volume resistance of the test piece in normal state was measured according to JIS K-6911.

To examine humidity resistance, a pressure cooker test (PCT) was carried out wherein the test piece was maintained in an autoclave (water medium) at a temperature of 121° C. and a pressure of 2 kg/cm$^2$, for 200 hours. After the test, the volume resistance of the test piece was again measured. The (PCT) test was carried out by admitting pure water into an autoclave, immersing the test piece in the water, pressurizing the water under an internal pressure of 2 kg/cm², placing the autoclave in an oil bath at 125° C., and maintaining the autoclave in the conditions for 200 hours.

TABLE 1

|  | Example | | | | | |
|---|---|---|---|---|---|---|
|  | 1 | 2 | 3 | 4 | 5*5 | 6*5 |
| Composition (parts by weight) | | | | | | |
| Polyimide*1 | 92 | 94 | 96 | 94 | 100 | 100 |
| Silicone | | | | | | |
| dimethoxydiphenylsilane | 8 | — | — | — | — | — |
| diphenylsilane diol | — | 6 | 4 | — | — | — |
| silicone oligomer*2 | — | — | — | 6 | — | — |
| Fused silica*3 | 235 | 235 | 180 | 235 | 235 | 235 |
| Alumina | — | — | 55 | — | — | — |
| γ-glycidoxypropyl-trimethoxysilane | 1 | 1 | 1 | 1 | 1 | — |
| Stearic acid | 1 | 1 | 1 | 1 | 1 | 1 |
| Carnauba wax | 1 | 1 | 1 | 1 | 1 | 1 |
| Carbon black | 0.5 | 0.5 | 0.5 | 0.5 | 0.5 | 0.5 |
| Properties | | | | | | |
| Tg (°C.) | 232 | 235 | 234 | 236 | 240 | 241 |
| Coefficient of linear expansion ($\times 10^{-5}$ cm/cm. °C.) | 1.6 | 1.5 | 1.8 | 1.5 | 1.5 | 1.5 |
| Volume resistance | | | | | | |
| Normal ($\times 10^{16}$ Ωcm) | 2.6 | 4.2 | 4.0 | 3.1 | 3.3 | 2.4 |
| After PCT*4 ($\times 10^{14}$ Ωcm) | 5.4 | 8.5 | 6.3 | 4.5 | 0.41 | 0.063 |

*1 Kerimide 601A manufactured and sold by Nihon Polyimide K.K., a polyaminobismaleimide prepolymer having a softening point of 80–90° C.
*2 SH-6018 manufactured and sold by Toray Silicone K.K, an OH-containing silicone oligomer having a molecular weight of 1600, an OH content of 6.5% and a melting point of 84° C.
*3 Fused Silica RD-8 manufactured and sold by Tatsumori K.K.
*4 Volume resistance after a 200-hour pressure cooker test.
*5 Comparative Example - no silicone component.

The polyimide resin composition of the present invention comprising (A) a polyaminobismaleimide resin, (B) a silicone monomer and/or oligomer having a hydroxyl or alkoxyl group bonded to a silicon atom, and (C) an inorganic filler results in a cured product experiencing little loss of volume resistance as compared with prior art after a pressure cooker test and having a high heat resistance and a low coefficient of linear expansion so that it is outstandingly advantageous for use in encapsulating semiconductors and as semiconductor package substrates and hybrid IC substrates.

We claim:

1. A polyimide resin composition comprising (A) a polyaminobismalemide resin comprising a reaction product obtained by reacting a bismaleimide of general formula (I):

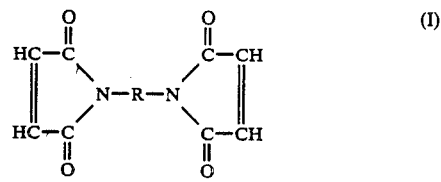

wherein R is a divalent organic radical, with an aromatic diamine of general formula (II):

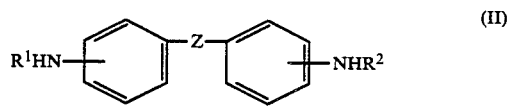

wherein Z is -CH$_2$-, -O-, -S-, -SO- or -SO$_2$-, and R$^1$ and R$^2$ are independently selected from the group consisting of hydrogen, lower alkyl radicals, aryl radicals, cycloalkyl radicals and lower acyl radicals;

(B) a silicone component selected from the group consisting of silicone monomers having a hydroxyl or alkoxy group bonded to a silicon atom, silicone oligomers having a hydroxy or alkoxy group bonded to a silicon atom and mixtures of said silicone monomers and silicone oligomers; and (C) an inorganic filler;

wherein the weight ratio of polyaminobismalemide resin (A) to silicone component (B) ranges from 99.5/0.5 to 70/30, and the weight ratio of polyamonobismaleimide resin (A) to inorganic filler (C) ranges from 100/50 to 100/1000.

2. The composition of claim 1 wherein the silicon component is selected from the group consisting of triphenylsilanol, diphenylsilane diol, methylphenylsilane diol, diethylsilane diol, dimethoxydiphenylsilane, diethoxydiphenylsilane, phenyltriethoxysilane, diethoxydimethylsilane, triethoxysilane, 1,1-dimethyl-3,3-diphenyldisiloxane-1,3-diol, 1,4-bis(hydroxydimethylsilyl)benzene, and diphenylethoxyvinylsilane and mixtures thereof.

3. The composition of claim 1 wherein the inorganic filler is selected from the group consisting of fused silica, crystalline silica, alumina and mixtures thereof.

4. The composition of claim 1 wherein the inorganic filler is fused silica.

5. The composition of claim 1 wherein R is a divalent aromatic radical.

* * * * *

UNITED STATES PATENT AND TRADEMARK OFFICE
CERTIFICATE OF CORRECTION

PATENT NO. : 4,885,329

DATED : December 5, 1989

INVENTOR(S) : KAORU TOMINAGA ET AL.

It is certified that error appears in the above-identified patent and that said Letters Patent is hereby corrected as shown below:

Column 8, line 1 (line 2 of the claim), "polyaminobismalemide" should read --polyaminobismaleimide--;

line 34 (line 2 of section (C), "polyaminobismalemide" should read --polyaminobismaleimide--; and line 37 (line 5 of section (C), "polyamonobismaleimide" should read --polyaminobismaleimide--.

Signed and Sealed this

Twenty-fifth Day of December, 1990

Attest:

HARRY F. MANBECK, JR.

Attesting Officer

Commissioner of Patents and Trademarks